United States Patent [19]
Oketani et al.

[11] Patent Number: 5,351,039
[45] Date of Patent: Sep. 27, 1994

[54] TOOLHOLDER DEVICE FOR MACHINE TOOLS

[75] Inventors: Tetsuya Oketani, Gifu; Hirotaka Nishikawa, Ichinomiya; Yoshiaki Mase, Gifu; Yukihiro Sakakibara, Handa, all of Japan

[73] Assignee: Howa Machinery, Ltd., Aichi, Japan

[21] Appl. No.: 827,227

[22] Filed: Jan. 28, 1992

[30] Foreign Application Priority Data

Jan. 30, 1991 [JP] Japan .................................. 3-031893

[51] Int. Cl.⁵ .............................................. G08B 21/00
[52] U.S. Cl. ......................................... 340/680; 408/6
[58] Field of Search .................. 340/680; 408/6, 11, 408/16; 73/862.326, 862.329; 173/20

[56] References Cited

U.S. PATENT DOCUMENTS

| | | | |
|---|---|---|---|
| 3,387,669 | 1/1968 | Wise, Jr. | 173/20 |
| 3,652,099 | 3/1972 | Bilz | 408/16 |
| 3,851,525 | 3/1974 | Parkinson | |
| 4,193,720 | 3/1980 | Machida | 408/6 |
| 4,488,443 | 12/1984 | Parkinson | 73/862.329 |
| 4,829,834 | 5/1989 | Masom | 73/862.329 |

Primary Examiner—Robert Raevis
Assistant Examiner—Christine K. Oda
Attorney, Agent, or Firm—Ladas & Parry

[57] ABSTRACT

A toolholder device for a machine tool comprises a holder body driven by a machine tool drive spindle, and a toolholder supported on the holder body so as to be circumferentially and axially displaceable. The holder body and the toolholder are provided with displacement detection elements which are arranged circumferentially in interdigitating relation. A support shaft extends from either member of the holder body and the toolholder toward the other member. The outer surface of the support shaft and the inner surface of a support hole of the other member to be fitted over the support shaft are formed with helical guide grooves which are opposite to each other and slopingly extends with respect to the rotational axis of the toolholder device. Balls are interposed between the opposite guide grooves to form a displacement translation mechanism which converts a rearward axial displacement of a tool and the toolholder due to overload axial thrust into a circumferential relative displacement between the adjacent detection elements. The relative displacement of the detection elements is detected by a detection unit which issues a warning signal. A compression spring in the device resists the axial displacement of the toolholder unless the axial thrust exceeds a predetermined value.

14 Claims, 12 Drawing Sheets

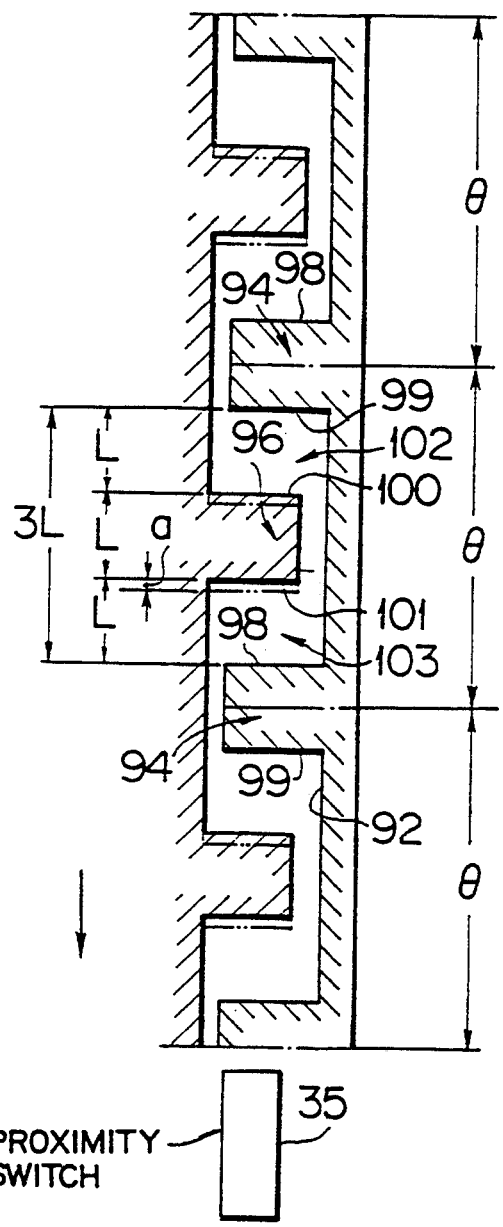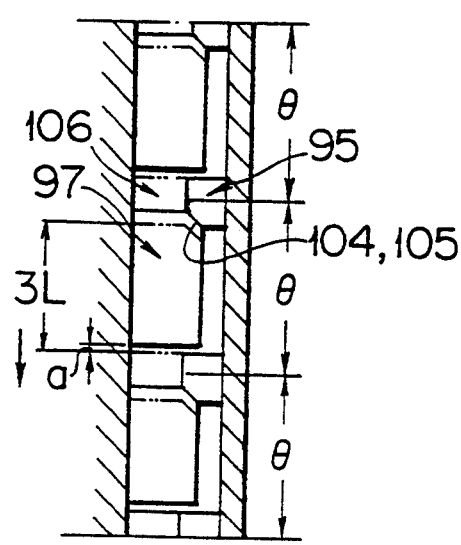
FIG. 11
FIG. 12

TOOLHOLDER DEVICE FOR MACHINE TOOLS

BACKGROUND OF THE INVENTION

The present invention relates to a toolholder device for machine tools and, more particularly, to a toolholder device capable of detecting overload thrust applied to the tool, such as a drill or tap, for preventing damage of the tool.

As is well known, when the discharge of chip is not carried out sufficiently during a cutting operation such as a drilling operation, the cutting torque increases to such a degree as to cause a damage to the cutting tool due to twisting. Furthermore, when a worn drill is fed forward at a constant rate, an excessive thrust is produced, causing a buckling of the drill.

In order to detect such excessive cutting torque and thrust during the cutting operation, an overload detection system for a machine tool has been proposed in U.S. Pat. No. 5,155,473.

In this proposed overload detection system, a drive toolholder or holder body driven by the drive spindle has a driven toolholder supported by the holder body in a manner to be rotatable and axially shiftable relative to the holder body. The driven toolholder is urged forwardly by a thrust setting spring. The drive holder body and the driven toolholder have their respective displacement detecting elements or teeth disposed circumferentially thereof in interdigitating relationship. Circumferentially adjacent displacement detecting teeth of the drive side and the driven side are brought into abutment with each other by means of a torsion coil spring connecting the driven toolholder with the drive holder body.

These displacement detecting teeth of the drive and driven sides have mutually engaging beveled surfaces at their mutually abutting sides. The beveled surfaces make a relatively small angle to the axial direction of the toolholder. When an overload axial thrust is exerted upon the tool and hence the driven toolholder, the displacement detecting teeth of the toolholder acts axially rearwardly on the displacement detecting teeth of the drive holder body at their beveled surfaces so that the detecting teeth of the driven toolholder are caused to shift circumferentially by virtue of the beveled surfaces. Thus, the axially rearward displacement of the detecting teeth is translated or converted into a circumferential displacement, which produces a relative circumferential displacement between the displacement detecting teeth of the drive and driver sides. The circumferential displacement thus obtained is used for detection of an axially rearward displacement of the tool and toolholder.

In the overload detection system described above, an axial displacement of the tool and toolholder is converted into a circumferential displacement by means of the beveled surfaces. This gives rise to a problem in that the amount of axial displacement of the toolholder influences on the depth of a hole to be cut by the tool. When the axial thrust force is such that its amount exceeds a preset value of the thrust load setting spring but is not so great as to cause a circumferential displacement sufficient to produce a detectable angular phase difference, the overload thrust will not be detected and the cutting operation will continue in normal way to finish a hole drilling. In this case, the drilled hole will have a smaller depth than a regular depth and the obtained depth is sometimes outside the tolerance limits.

SUMMARY OF THE INVENTION

The object of the present invention is to solve the above problem and to provide a toolholder device for a machine tool capable of lessening the influence on the depth of a hole to be cut, under overload thrust condition, by making the amount of axial displacement the toolholder as small as possible.

According to the present invention, there is provided a toolholder device for a machine tool of the type having a drive spindle for imparting rotation to a cutting tool, said toolholder device comprising: a holder body to be coaxially coupled to the drive spindle for joint rotation therewith; a driven toolholder coupled to the holder body so as to be rotatable coaxially with the holder body and to be movable axially relative to the holder body, said toolholder having means for coaxially holding the cutting tool; spring means disposed between the holder body and the driven toolholder for yielding axially to cause the toolholder to axially displace relative to the holder body only when an axial thrust force exceeding a set value is applied to the cutting tool; a set of displacement detecting elements provided on the holder body at circumferential spacings about an axis of the holder body and the toolholder; a set of displacement detecting elements provided on the toolholder at circumferential spacings about said axis and arranged interdigitatingly with the displacement detecting elements of the holder body with clearances therebetween; displacement translation means provided the toolholder device radially inwardly of the displacement detecting elements and having sloping surface means for converting an axial displacement of the toolholder into a circumferential displacement of the same, thereby causing a relative angular phase displacement of the displacement detecting elements of the toolholder relative to the displacement detecting elements of the holder body; and means for sensing the angular phase displacement to detect at least an axial thrust force exceeding the set value.

According to the present invention, the displacement translation means is placed radially inwardly of the displacement detecting elements so that translated circumferential displacement of the toolholder is multiplied at the displacement detecting elements located radially outwardly of the translating means and the multiplied circumferential displacement can be reliably detected.

The above and other features and advantages of the present invention and the manner of realizing them will become more apparent, and the invention itself will best be understood, from a study of the following description and appended claims, with reference to the attached drawings showing some preferable embodiments of the invention.

BRIEF DESCRIPTION OF THE DRAWINGS

FIG. 11 is a developed diagram of the entire circumference of the displacement detection elements and the reference displacement detection elements of the toolholder device of the fourth embodiment;

FIG. 12 is a developed diagram of the entire circumference of displacement translation elements and the reference displacement translation elements of the toolholder device of the fourth embodiment;

DESCRIPTION OF THE PREFERRED EMBODIMENTS

Figure 1:
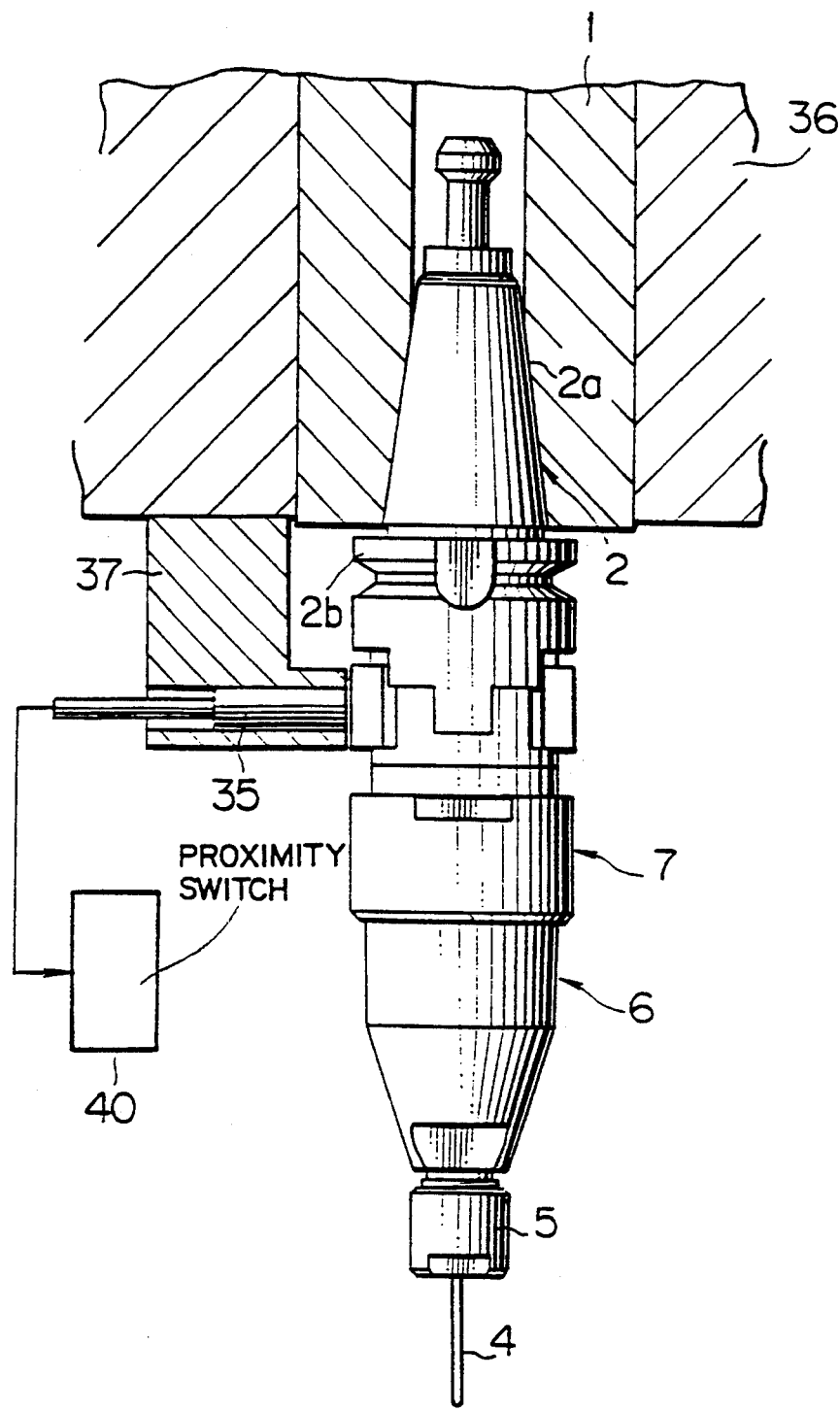
FIG. 1 is a front view of a toolholder device in accordance with a first embodiment of the present invention.
Figure 2:
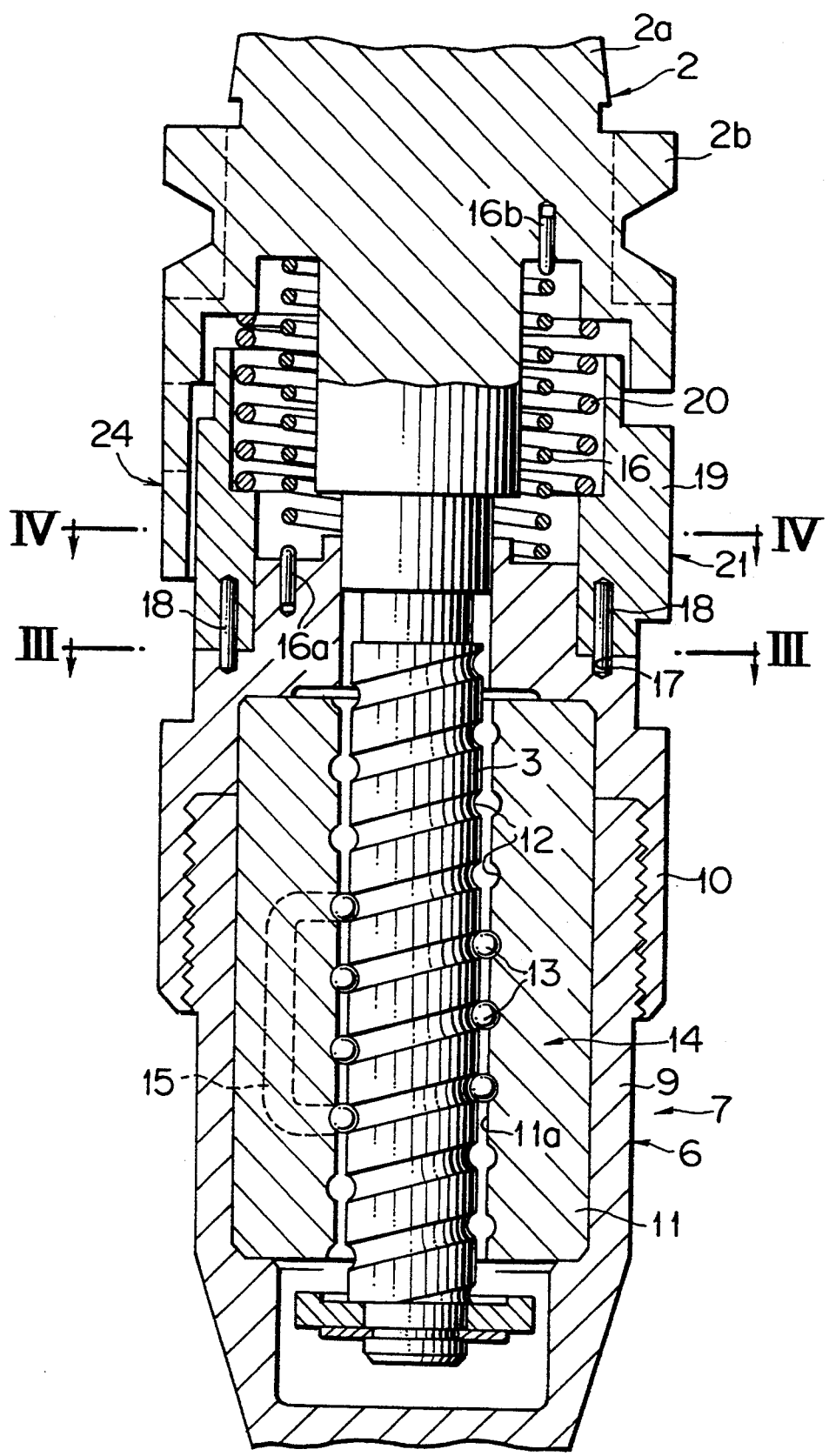
FIG. 2 is a fragmentary, enlarged sectional view the toolholder device in accordance with the first embodiment.

FIGS. 1 and 2 show a toolholder device 7 for machine tools in accordance with a first embodiment of the present invention. The toolholder device 7 comprises a holder body 2 detachably secured to a drive spindle 1 of a machine tool, and a driven toolholder 6 having at its distal end a collect chuck 5 for gripping a cutting tool 4. The holder body 2 includes a tapered portion 2a, a grip portion 2b integrally formed with the tapered portion 2a, and a support shaft 3 extending forward or downward (as viewed) centrally from the grip portion 2b. The support shaft 3 extends into the driven toolholder 6 which includes a holding tube 9, a connection tube 10 integrally screwed onto the periphery of the holding tube 9, and a support tube 11 fixedly secured in a hollow defined by the tubes 9 and 10. A support hole 11a formed within the support cylinder 11 and the outer surface the support shaft 3 are provided with sloping guide grooves or lead grooves 12 confronting each other and helically extending about the rotational axis of the toolholder device 7. Between the two guide grooves 12 there are interposed a plurality of steel balls 13 to constitute a displacement translation mechanism 14 which converts an axial displacement of the driven toolholder 6 relative to the holder body 2 into a circumferential rotational movement when the tool 4 is adversely subjected to at least overload thrust force. A circulation passage 15 is provided within the support tube 11 for circulating the balls 13.

As described above, the displacement translation mechanism 14 formed within the toolholder device 7 is a ball thread structure in which the balls are in rolling contact with the support shaft 3 and the support cylinder 11 to reduce the frictional force. The lead angle of the screw threads is approximately 9 degrees.

Figure 3:
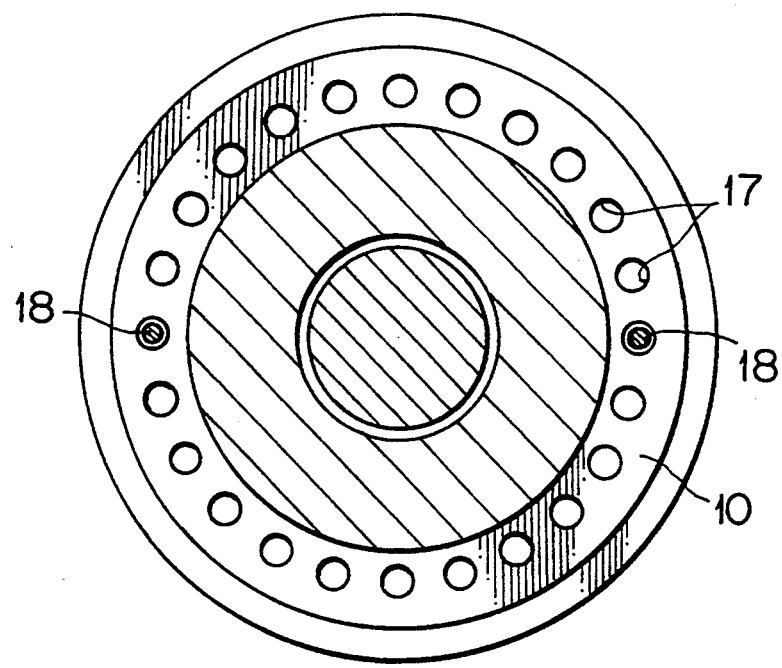
FIG. 3 is a sectional view taken along the line III—III in FIG. 2.

A torsion coil spring 16 for transmitting the torque has one end 16a linked with the connection tube 10 of the driven toolholder 6, and the other end 16b linked with the grip portion 2b of the holder body 2, to thereby transmit the rotational movement of the holder body 2 to the driven toolholder 6 during the machining operation. As shown in FIG. 2, a detection ring 19 has fixed thereto a couple of diametrically oppositely arranged engagement pins 18 which are engaged with or disengaged from a multiplicity of engaging holes 17 provided in the connection tube 10 as shown in FIG. 3. The detection ring 19 is downwardly (as viewed) urged by a spring 20 intervening between the detection ring 19 and the grip portion 2b whereby the detection ring 19 is secured to the connection tube 10. In order to adjust the torsional force of the torsion coil spring 16, therefore, the detection ring 19 is moved backward (upward in FIG. 2) against the action of the spring 20 for disengagement of the pins 18 from the engaging holes 17, and then the connection tube 10 is circumferentially turned to again engage the pins 18 with other engaging holes 17 of the detection ring 19. The torsional force of the torsion coil spring 16 is determined to be smaller than a smaller one of the maximum allowable thrust load and the maximum allowable torque, so as to be able to cope with both the thrust load and the torque to be applied to the tool 4.

Figure 4:
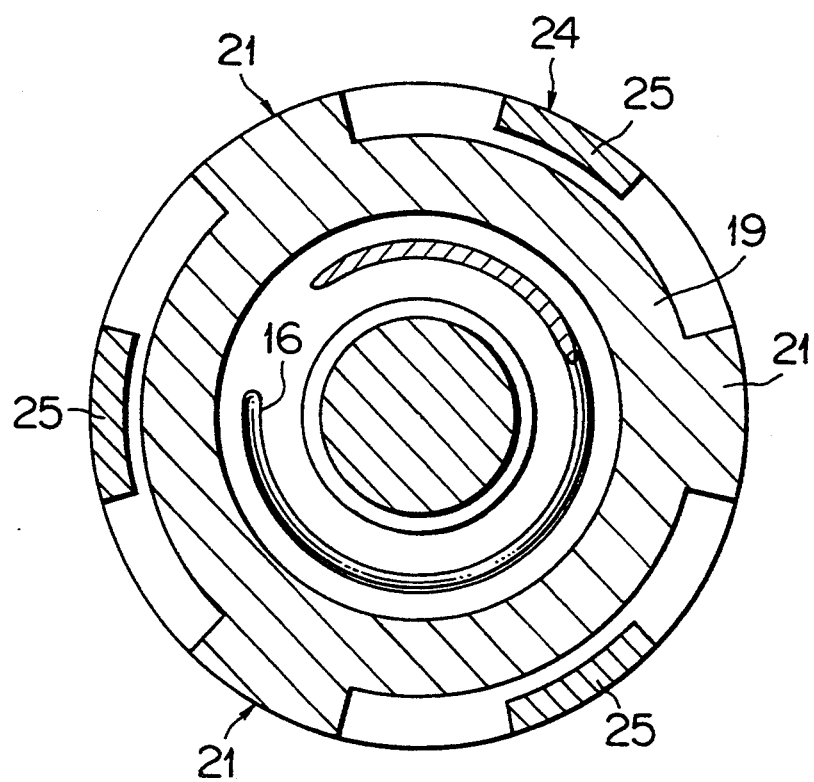
FIG. 4 is a sectional view taken along the line IV—IV in FIG. 2.
Figure 5:
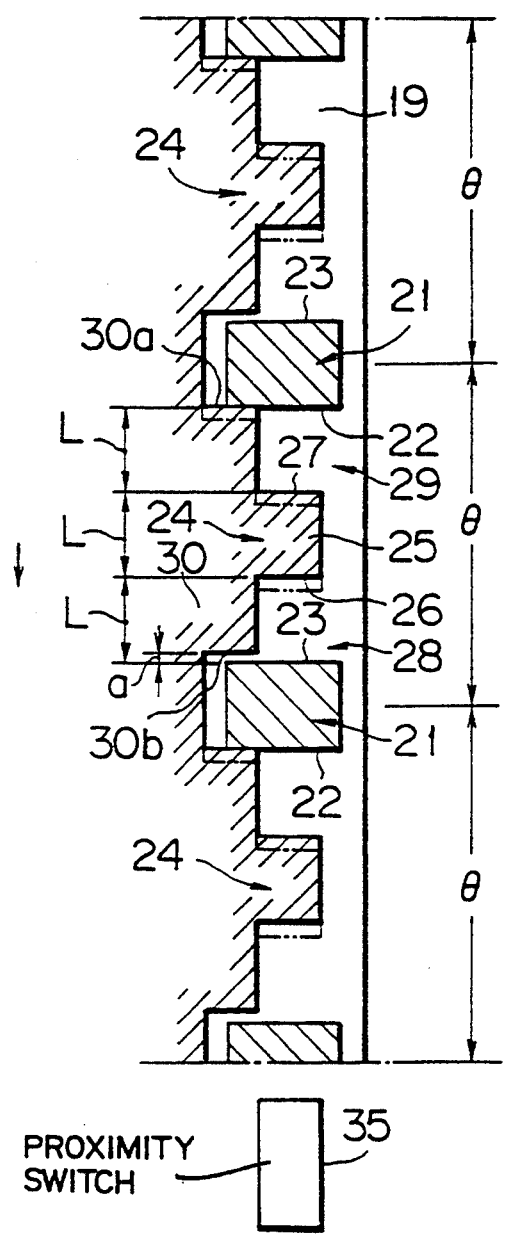
FIG. 5 is a developed diagram showing the entire circumference of displacement detection elements and reference detection elements of the toolholder device in accordance with the first embodiment.

As illustrated in FIG. 4, three displacement detecting elements 21 are provided at equally angularly spaced relation (at intervals of an angle $\theta$ (120 degrees) as shown in FIG. 5) along the circumference of the detection ring 19. As is apparent from FIG. 5 each of the displacement detecting elements 21 has two detraction portions 22 and 23 which are located on two sides of each element 21 with respect to the rotational direction of the toolholder device. These detection portions function for the initiation or completion of the detection by means of a proximity switch 35 described later.

As shown in FIG. 5, into the spaces defined between adjacent displacement detecting elements 21 extend three reference detecting elements 24 from the grip portion 2b, each element 24 having a central projection 25. Both the sides of the central projection 25 with respect to the direction of rotation of the toolholder device function as a pair of detection portions 26 and 27 for the initiation or completion of the detection by the proximity switch 35 detailed later. Within the interval of $\theta$ (120) degrees in the rotational direction, a pair of detection spacings 28 and 29 for detecting rotational displacement are formed between the detection portions 26 and 23, and between the detection portions 22 and 27, respectively. As a result, three pairs of such detection spacings 28 and 29 are provided along the circumference of the detection ring 19. The proximity switch 35 is turned off when sensing the detection spacings 28 and 29. One side of the displacement detecting element 21, e.g., the detection portion 22 is normally caused to abut against one side 30a of a shoulder 30 of the reference detecting element 24, by virtue of torsional force of the torsion coil spring 16. In this normal state, there exists a small clearance a (FIG. 5) circumferentially between the other side 30b of an opposite shoulder 30 and the adjoining detection portion 23. A pulse mount value corresponding to the absolute value 2a is determined larger than a set value t to be described hereinafter. Each of the detection spacings 28 and 29, the central protrusion 25 and the displacement detecting element 21 have the same dimension L (30 degrees) in the circumferential direction.

It is important in this invention that because the displacement detecting elements 21 and 24 are disposed radially outwardly of the displacement translation mechanism 14 a translated circumferential displacement at the translation mechanism 14 will be multiplied in the region of the displacement detecting elements 21 and 24, as will be understood from a description to be made hereinafter.

Figure 6:
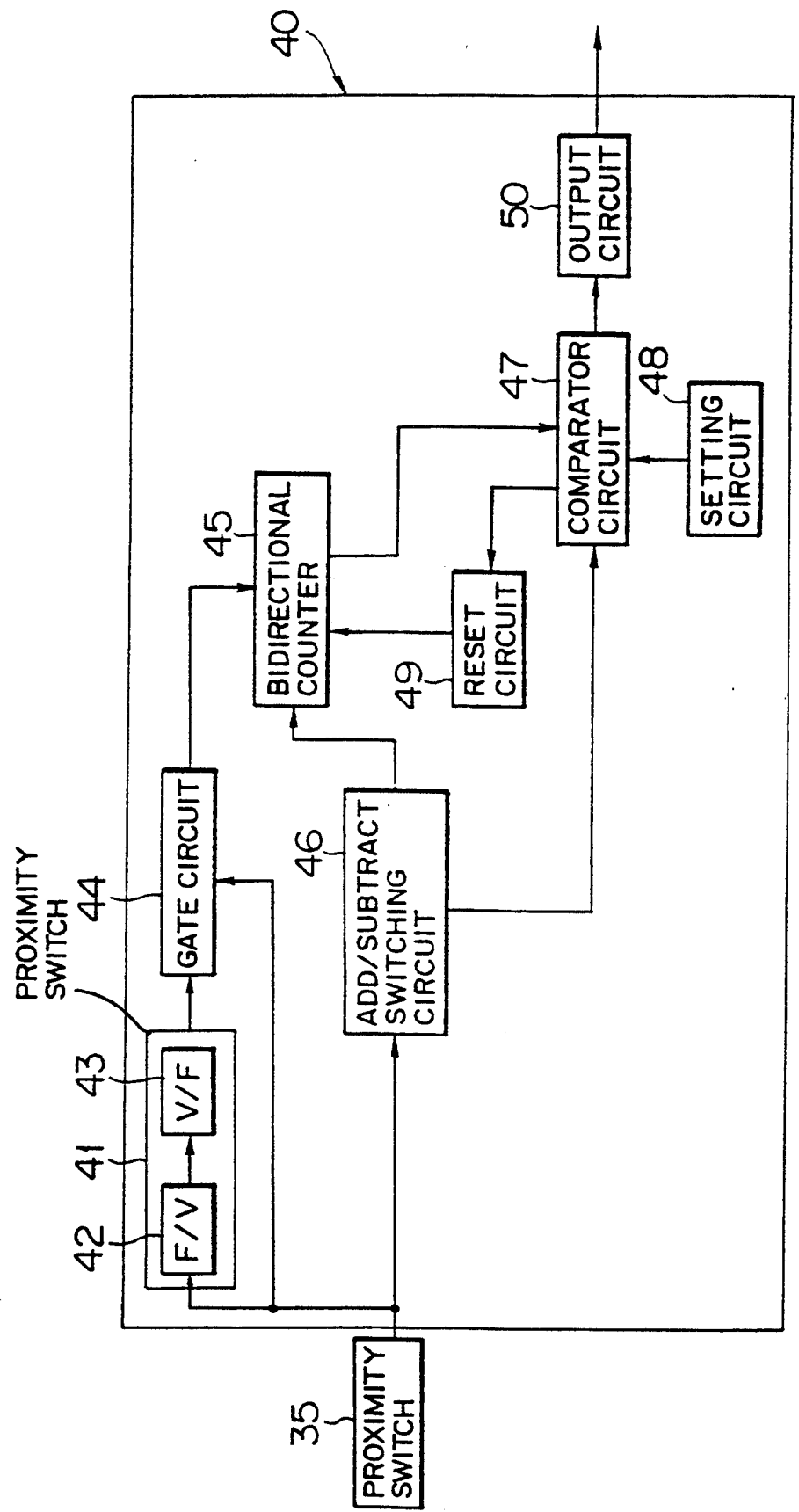
FIG. 6 is a block diagram of an overload detection unit.

As shown in FIG. 1, the single proximity switch 35 for sensing the detection spacings 28 and 29 is attached by a bracket 37 fixedly secured to the front face of a spindle head 36. Signals from the proximity switch 35 are transmitted to an overload detection circuit 40 for judging excessive torque and/or thrust load as shown in FIG. 6.

The overload detection circuit 40 includes a spindle pulse generator 41 herein shown as a serial connection of a frequency to voltage converter 42 and a voltage to frequency converter 43. The proximity switch 35 is connected directly to the converter 52. The spindle pulse generator 41 averages and multiplies the pulses generated by the proximity switch 35 and outputs a series of spindle pulses at a prescribed rate per revolution of the drive spindle 1.

A gate circuit 44 has an input connected directly to the proximity switch 35 and another to the spindle pulse generator 41. The gate circuit 44 is open each time the proximity switch 35 is off, permitting the passage of the spindle pulses therethrough.

The output of the gate circuit 44 is connected to a bidirectional counter 45, which has another input connected to the proximity switch 35 via an add/subtract switching circuit 46. This switching circuit 46 causes the counter 45 to alternately add and subtract the incoming spindle pulses during the successive on-off cycles of the proximity switch 35.

A comparator circuit 47 has three inputs connected respectively to the counter 45, the add/subtract switching circuit 46, and a setting circuit 48. The add/subtract switching circuit 46 delivers to the comparator circuit 47 a judgment command when the proximity switch 35 goes on. The comparator circuit 47 responds to this judgment command by judging whether or not the count of the counter 45 is more than a reference value that has been preset on the setting circuit 48. An output circuit 50 produces a warning signal if the counter count is more than the preset reference value. Connected between comparator circuit 47 and counter 45, a reset circuit 49 functions to reset the counter each time the judgment has been made by the comparator circuit 47.

The reference value to be preset on the setting circuit 48 may be equal to the difference, plus an allowable range of deviations, between the counts of the counter 45 when the proximity switch 35 is opposed to the spacings 28 and 29 (FIG. 5), with no load exerted on the cutting tool 4. This difference may be zero in this embodiment, so that the reference value may represent only an allowable range of deviations for the successive pulse counts to be made by the counter 45 during the operation of the machine tool.

The overload detection circuit 40 of FIG. 6 is susceptible to a variety of modifications within the broad teaching hereof. For instance, the spindle pulses may be obtained from the encoder, not shown, associated with the servomotor, also not shown, driving the spindle 1. Also, instead of the spindle pulses produced as above stated, other pulses may be input to the counter at a constant repetition rate from a suitable source of such pulses, and an overload detection signal may be produced when the difference between the pulse counts at the spacings 28 and 29 exceeds a reference value. However, in this case, the reference value must vary with the rotational speed of the drive spindle 1, so that it may be amended with the spindle speed.

In the structure described above, the rotational movement of the holder body 2 during normal machining is transmitted to the toolholder 6 by way of the torsion coil spring 16 for execution of the machining operation. ON or OFF signals are repeatedly and alternately output from the proximity switch 35. The proximity switch 35 is turned off in the area of the detection spacing 28 while the gate circuit 44 is opened during that time to add the spindle angular pulse $P_s$ to the counter 45 under an addition command produced by the add/subtract switching circuit 46. Subsequently the proximity switch 35 is turned on due to the detection of the central protrusion 25, and gate circuit 44 is closed for changeover into the subtraction mode. When the proximity switch 35 senses the detection spacing 29 and is again turned off, the spindle angular pulse $P_s$ is subtracted from the pulse count value which is the result of the addition in the preceding step. Then the proximity switch 35 senses the displacement detecting element 21 and is turned on so that the judgment command signal is output to compare the count value with the set value t. In the case of normal machining, one side of each displacement detecting element 21 is in contact with the one side 30a of each shoulder 30 of the reference detecting element 24 owing to the force of the torsion coil spring 16 and the conversion mechanism 14, and hence the detection spacings 28 and 29 are maintained to have the same dimension L. Thus the count value within the counter 45 becomes zero, and the output signals for the excessive or overload torque are not generated.

Description will next be made of the case where only excessive thrust load is applied to the tool 4 due to wear of the tool, The coiled torsion spring 16 will not be twisted until excessive thrust load surpassing the torsional force of the torsion coil spring 16 is applied to the tool 4, and accordingly the displacement detecting elements 21 are positioned with respect to the reference detecting elements 24 as seen in FIG. 5. When an excessive thrust load or overload thrust is applied to the tool 4, the toolholder 6 is retracted relative to the holder body 2, and the axial displacement is converted into a circumferential rotational displacement in a direction opposite to the rotational direction, with the aid of the displacement translation mechanism 14, which results in relative rotation of the reference detecting elements 24 by an angular amount corresponding to the clearances a shown in FIG. 5, thus allowing the side surface 30b of each shoulder 30 to abut against the side detection portion 23, This relative rotation decreases the circumferential dimension of the detection spacing 28 to (L−a) and increases that of the detection spacing 29 to (L+a), Consequently, the result obtained by adding in the area of the detection spacing 28 and by subtracting in the area of the detection spacing 29 becomes −2a, and the absolute value 2a is greater than the preset value t, whereby output signals of excessive thrust are delivered from the output circuit 50. In accordance with the output signals of excessive thrust, a stop command or a step-back command is issued to the spindle motor. Furthermore, the output signals may be counted by a life counter to replace the tool with a new one identical to the tool even during the machining when the count value within the counter exceeds a predetermined number of times.

It will be appreciated that since the displacement translation mechanism 14 is arranged within the toolholder 7, axial displacement of the toolholder 6 is converted by the translation mechanism 14 into a circumferential angular displacement which is determined by the inclination or sloping angle of the guide groove 12, at the location of the guide groove 12 of the mechanism 14. This circumferential angular displacement produced by the translation mechanism 14 is then multiplied at the peripheral location depending on the ratio of the radius from the rotational center of the toolholder device 7 to the guide groove 12 to the radius from the center to the detection elements 21 and 24. Therefore, the amount of axial displacement of the toolholder 6 required for the circumferential displacement corresponding to the clearances a of the detecting elements 21 and 24 is reduced to the reciprocal of the ratio discussed above, as compared with the conventional case. Moreover, since the ball screw mechanism acting as the translation mechanism has a small lead angle, the axial displacement is even diminished due to the gentle lead angle thereof. This lessens the influence of the axial retracting displacement of the toolholder 6 upon the depth of the hole. It should be noted that the same operation as described above will occur in the case where the tool is subjected to only excessive torque greater than the force of the torsional coil spring 16 or to simultaneous excessive torque and thrust load.

Figure 7:
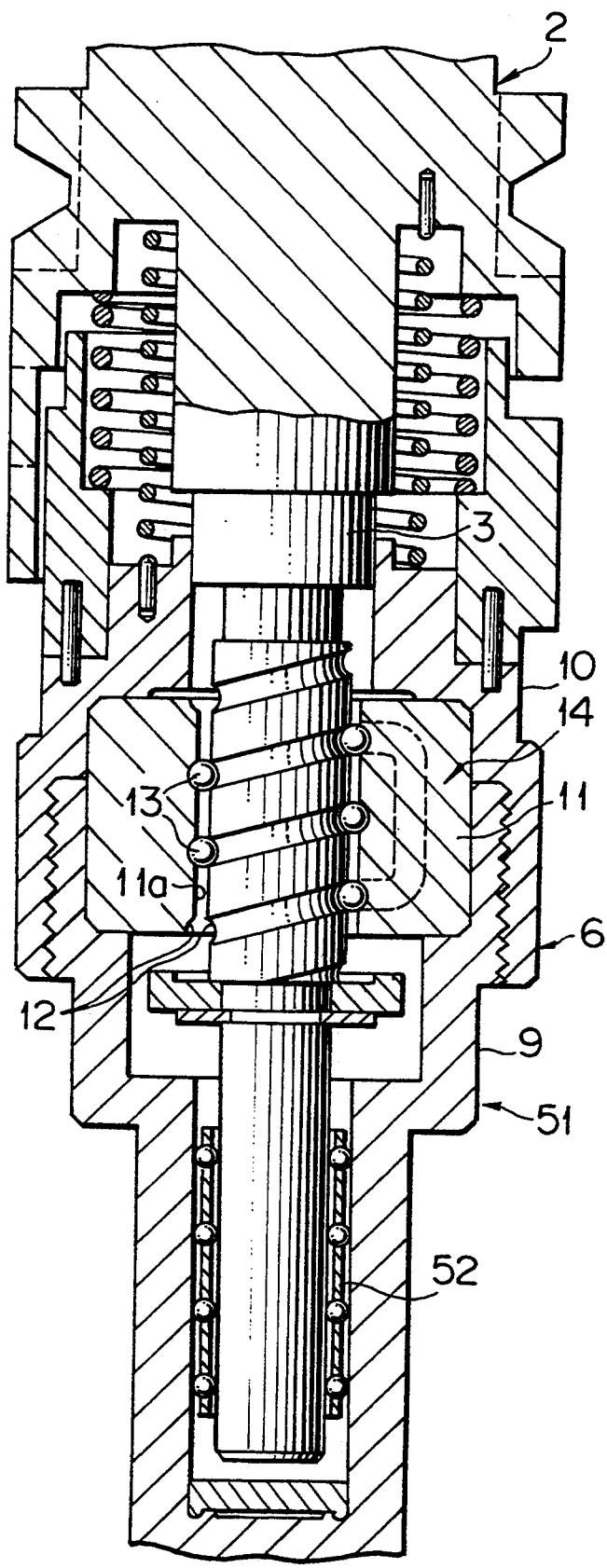
FIG. 7 is a sectional view of a second embodiment of the invention.

A toolholder device 51 of the second embodiment will next be described with reference to FIG. 7. The toolholder 51 comprises a holder body 2, a support shaft integral with the holder body 2, and a driven toolholder 6 including a holding tube 9, a connection tube 10 and a support cylinder 11 fixed to the tubes 9 and 10. The toolholder 6 is fitted around the support shaft 3. In the same manner as in the first embodiment there are provided guide grooves 12 around the upper (as viewed) portion of the support shaft 3 and in the support holes 11a of the support cylinder 11 having an axial dimension corresponding to the upper portion of the support shaft 3, respectively. Balls 13 are interposed between the guide grooves 12 to constitute a ball-screw displacement translation mechanism 14. Further, a ball bearing is interposed between the lower (as viewed) portion of the support shaft 3 and the inner hole of the holding tube 9. The support cylinder 11 constituting the toolholder 6 of the toolholder device 51 has a smaller axial dimension than that of the support cylinder 11 of the toolholder device 7 of the first embodiment, which results in a relatively small mass of the toolholder 6 and hence a reduction of the inertia force at the time of the rotation and the stop of the drive spindle.

The pair of guide grooves 12 constituting the displacement translation mechanism 14 of the toolholder 51 are in the form of lead grooves, but alternatively a plurality of cam grooves may be provided along the tracks of the lead grooves to constitute guide grooves as a whole.

Figure 8:
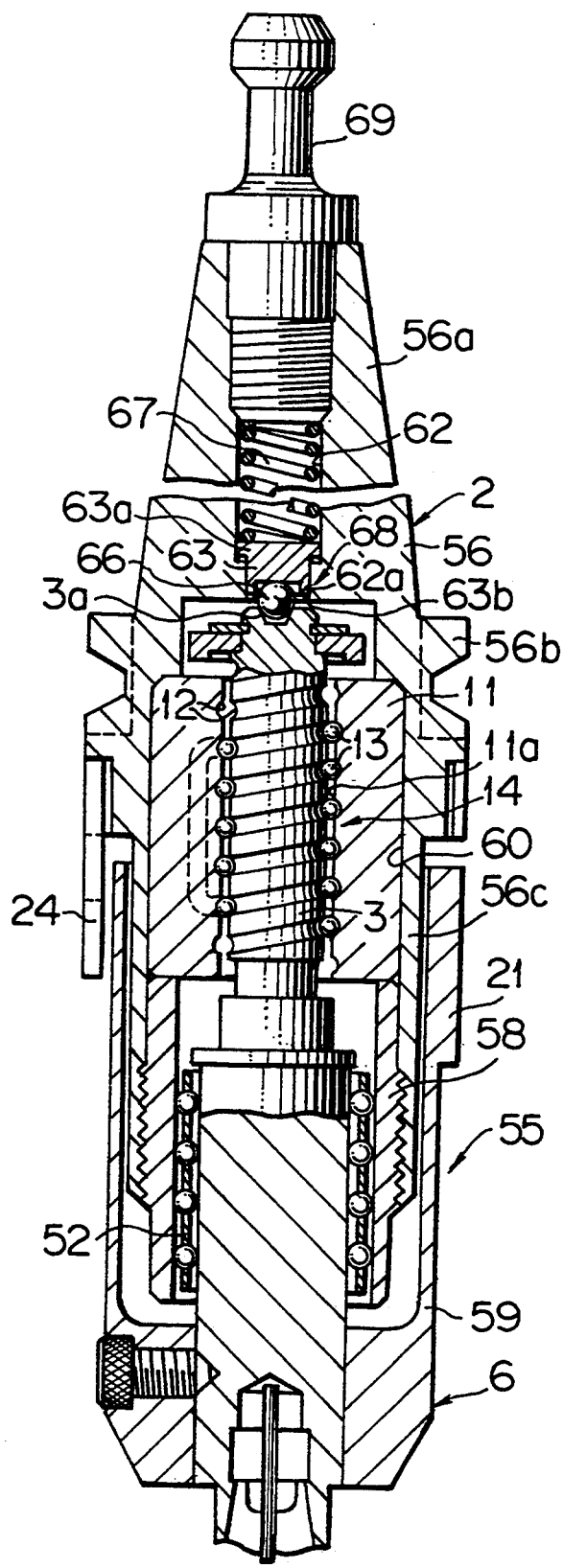
FIG. 8 is a sectional view of a third embodiment of the invention.

Referring now to FIG. 8, description will be made of a third embodiment of the present invention. The toolholder device 55 comprises a holder body 2 including a holder tube 56, a support cylinder 11 and a bearing tube 58, and a toolholder 6 including a detection tube 59 integrally screwed around the lower periphery of a support shaft 3. The holder tube 56 includes a tapered portion 56a formed in the upper part thereof, a grip portion 56b integral with the tapered portion 56a, and a tubular portion 56c extending downwardly from the grip portion 56b. In assembly, the support cylinder 11 is initially fitted into an insertion hole 60 of the tubular portion 56c, and then the outer periphery of the bearing tube 58 is integrally screwed into the insertion hole 60 from below to form the holder body 2. The top portion of the support shaft 3 of the toolholder 6 is fitted into a support hole 11a provided within the support cylinder 11. The support hole 11a and an upper peripheral portion of the support shaft 3 are correspondingly provided with guide grooves 12 in the same manner as in the first embodiment. Balls 13 are interposed between the guide grooves 12 for the formation of the displacement translation mechanism 14. A ball bearing 52 is interposed between the bearing tube 58 and an intermediate outer peripheral portion of the support shaft 3.

Within the tapered portion 56a of the holder body 2 is provided a central hole 62 opening into the insertion hole 60. The central hole 62 has at its bottom a shoulder 62a for abutting against a flange 63a of a cylindrical block 63 inserted into the central hole 23. The bottom end surface of the cylindrical block 63 and the top end surface of the support shaft 3 have recesses 63b and 3a, respectively which cooperate to receive a steel ball 66 therebetween. In addition, the cylindrical block 63 is downwardly forced by a thrust load setting spring 67 in the hole 62. A support mechanism 68 is thus configured. By virtue of the pressing force exerted between the cylindrical block 63 and the steel ball 66 of the support mechanism 68, and between the upper end surface of the support shaft 3 and the steel ball 66, the rotational movement of the holder body 2 is transmitted to the toolholder 6. The compressive force of the spring 67 subjected to the excessive thrust load or torque caused in the tool can be adjusted by removing a pull stud 69 to replace the spring 67 with a spring having a different compressive force.

A reference detecting element 24 integrally screwed around the outer periphery of the holder tube 56 constituting the holder body 2, and a displacement detecting element 21 provided on the outer periphery of the detecting tube 59 constituting the toolholder 6 are substantially the same in shape and configuration as those employed in the first embodiment. An overload detecting circuit 40 for detecting excessive torque (or thrust load) is equivalent to that in the first embodiment.

Description will be made hereinbelow of a case where the tool is subjected to only excessive thrust load (the same is true of a case where the tool is subjected to only excessive torque or simultaneous excessive thrust load and excessive torque). The rotational movement of the holder body 2 is transmitted in normal operation to the toolholder 6 by way of the support mechanism 68 unless the tool is subjected to an excessive thrust load greater than the maximum compressive force of the spring during a drilling operation. In the normal operation, She support mechanism 68 and the displacement translation mechanism 14 cause one side 22 of the displacement detecting element 21 to be in contact with one side 30a of the shoulder 30 of the reference detecting element 24 as shown in FIG. 5, and accordingly the output signal of excessive thrust load will not be generated. When an excessive thrust load is applied to the tool, a slippage takes place at the pressure contact point between the steel ball 66 and the cylindrical block 63 while backward compression of the spring 67 occurs in the support mechanism 68. As a result, the toolholder 6 is retreated relative to the holder body 2. This backward axial displacement is converted into a circumferential rotation by means of the motion translation mechanism 14, and the displacement detecting element 21 is rotated a predetermined angle (which corresponds to the clearances in the present embodiment) oppositely to the rotational direction with respect to the reference detecting elements 24. This rotational movement causes a difference in the number of pulses to be counted between the detecting spacings 28 and 29, which results in the output of detection signals of the excessive thrust load.

Referring next to FIGS. 9, 10, 11 and 12, a toolholder device 70 of the fourth embodiment will be described. A holder body 2 comprises a tapered portion 71 formed in the upper part thereof, a grip portion 73 integrated with the tapered portion 71, a support shaft 74 axially slidably inserted in the center of the tapered portion 71, and a thrust load setting spring 75 for biasing the support shaft 74 downwardly as viewed in FIG. 9. The spring 75 is subjected to thrust load imposed on the tool, such as a drill, held by the toolholder 6 and designed so as not to axially yield backward until it is surpassed by an axial thrust load of a predetermined setting value. The support shaft 74 has a front end surface 76 of conical shape, and a sleeve 77 is slidably fitted around the shaft 74. The sleeve 77 has a rear end surface 78 shaped into a conical surface. Relatively large- and small-diameter pivot ball bearings 79 and 80 for bearing the conical surfaces 76 and 78, respectively are fitted into a holding tube 81 of the toolholder 6. Between a spring retainer 82 mounted on the support shaft 74 so as not to be forwardly displaceable in the axial direction and a flange 77a of the sleeve 77, there is interposed a spring 83 whose spring force conifers a preload to the pivot ball bearings by way of the two conical surfaces 76 and 78. The spring force is set to provide a pre-load which minimizes the frictional torque caused by the pivot ball bearings 79, 80. A collect chuck for holding the tool is attached to the front end of the holding tube 81. In place of the pivot ball bearings, deep groove ball bearings may be used.

A connection tube 84 is integrally screwed on the periphery of the holding tube 81. A torsional coil spring 85 for torque transmission has one end connected to the connection tube 84 and the other end connected to the grip portion 73. On the connection tube 84 there are provided a couple of engaging pins 86 which engage in any two of a multiplicity of engaging holes 87 of a detection ring 88. The detection ring 88 is biased forwardly by a spring 89 interposed between the ring 88 and the grip portion 73. Accordingly, for adjustment of the torsional force of the coiled torsion spring 85, the detection ring 88 is first displaced upward against the spring force to disengage the engaging holes 87 from the engaging pins 86. Then the holding tube 81 and the connection tube 84 are circumferentially rotated before other engaging holes 87 of the detection ring 88 are engaged with the engaging pins 86.

Figure 9:
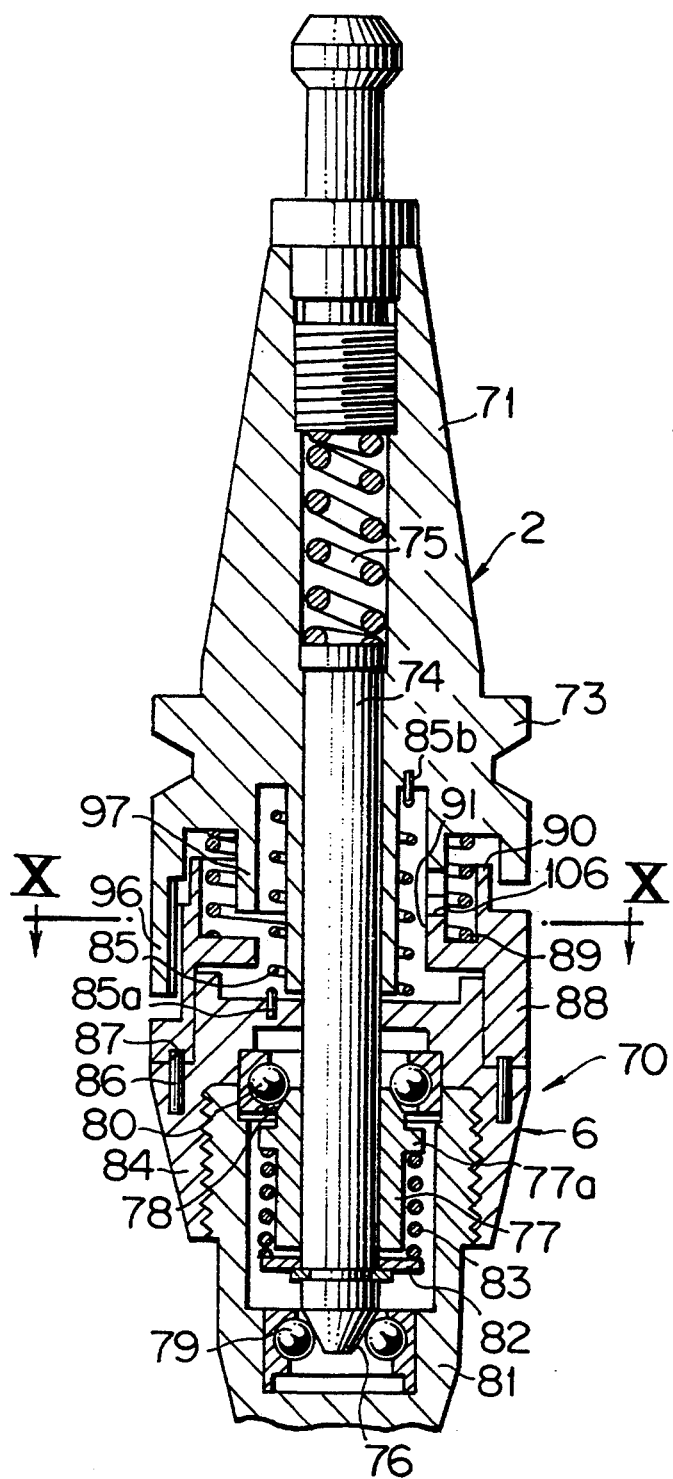
FIG. 9 is a sectional view of a toolholder device of a fourth embodiment of the invention.
Figure 10:
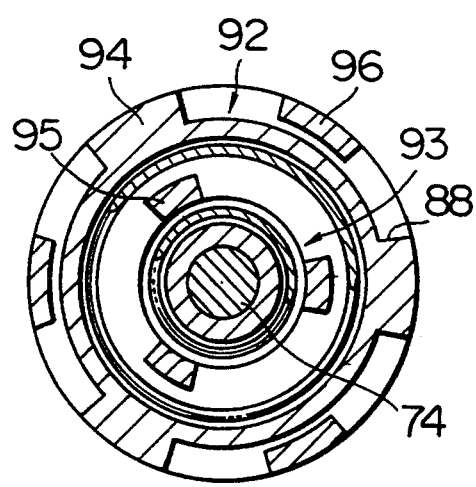
FIG. 10 is a sectional view taken along the line X—X in FIG. 9.
Figure 13:
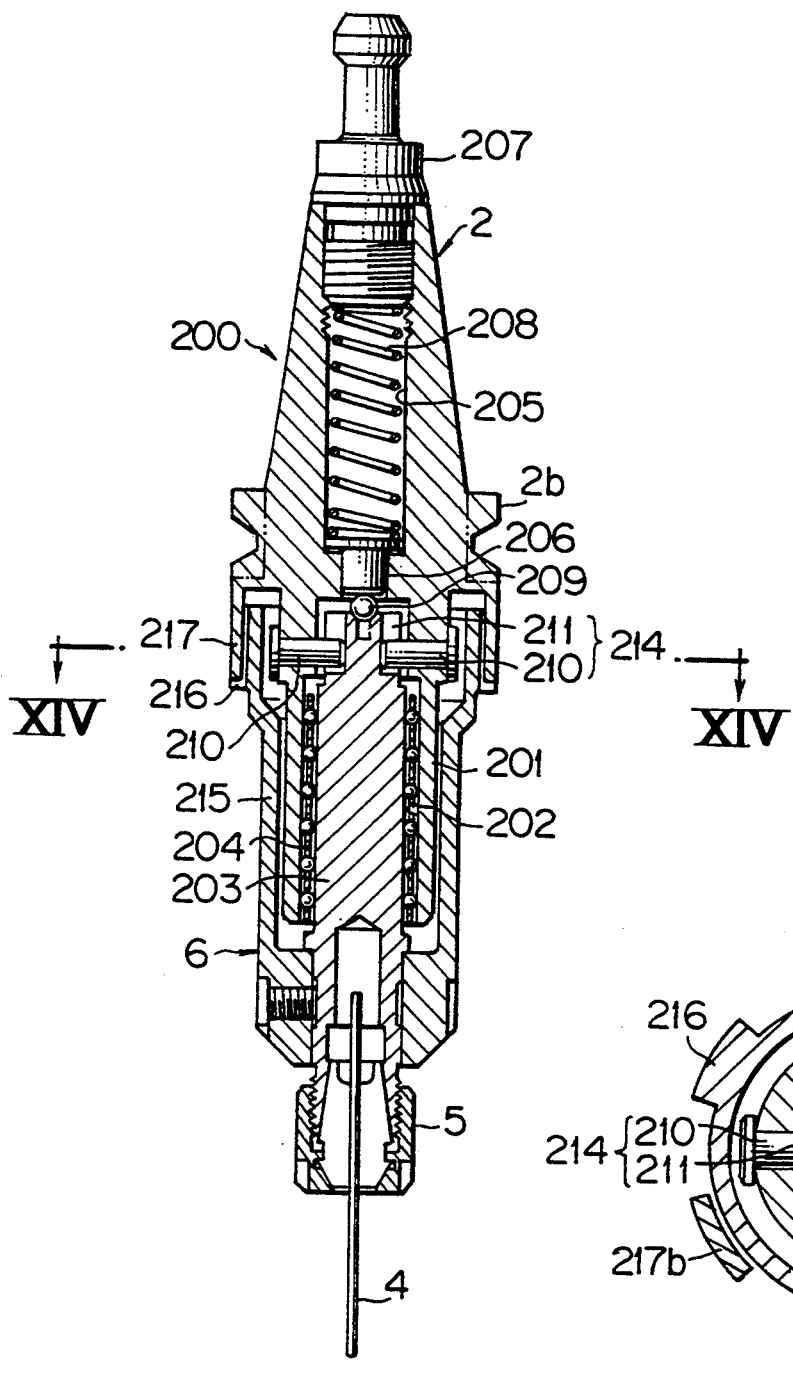
FIG. 13 is a sectional view of a fifth embodiment of the invention.

The upper portion of the detection ring 88 is shaped to have relatively large and small diameter of tubular portions 90 and 91 which, as shown in FIG. 10, have a plurality of (three for each in FIG. 10) recesses 92 and 93, respectively. In the recesses 92 and 93 there are provided three displacement detection elements 94 and three displacement translation element 95 which are circumferentially equally angularly spaced (at intervals of angle $\theta$ (120°) as shown in FIGS. 11 and 12). As shown in FIGS. 9 and 10, three reference detection elements 96 project from the grip portion 73 into the three recesses 92 of the large-diameter tubular portion 90, while as shown in FIG. 12 three reference displacement translation elements 97 project from the grip portion 73 into the three recesses 92 of the small-diameter tubular portion 91. As shown in FIG. 11, sides of the displacement detection elements 94 and the reference detection elements 96 in respect of the rotational direction serves for initiation and termination of the detection by a proximity switch 35 in the same manner as in the first embodiment. A pair of detection spacings 102 and 103 for rotational displacement are formed between a pair of the sides 99 and 100, and between the sides 98 and 101, respectively. Therefore, three pairs of detection spacing are provided along the circumference. Upon detecting these detection spacings 102 and 103, the proximity switch 35 is turned off.

As clearly seen from FIG. 12, each reference displacement translation element 97 has at one side a sloping slant surface 105 designed to engage a slant surface 104 provided on one side of the displacement translation element 95. The slant surface 104 is brought into contact with the slant surface 105 by the torsional force of the torsional coil spring 85 to constitute a displacement translation mechanism by which axial movement of the toolholder 6 is converted into a circumferential rotational movement when the tool is subjected to excessive thrust load. When the slant surfaces 104 and 105 are in contact with each other, there is a small circumferential clearances (designated by a in FIGS. 11 and 12) between the other side surface of the reference translation element 97 and one side surface of the adjacent displacement translation element 95 in the rotational direction. Moreover, the pair of detection spacings 102 and 103, the reference detection element 96, the displacement detection element 94, and displacement translation element 95 all have the same circumferential dimension L (30 degrees) while the recesses 92 and 93 of the relatively large- and small-diameter tubular portion 90 and 91, respectively, and the reference translation element 97 all have the same circumferential dimension 3L (90 degrees). Besides, an overload detection circuit 40 for detecting excessive thrust load (or excessive torque) is equivalent to that employed in the first embodiment.

Description will next be made of a case where the tool is subjected to only excessive thrust load. The rotational movement of the holder body 2 is normally transmitted to the toolholder 6 for machining unless an excessive thrust load surpassing a setting thrust load of the spring 75 is applied to the tool during the machining operation. In this normal operation, the slant surfaces 104 and 105 of the displacement translation element 95 and the reference displacement translation element 97, respectively are in contact with each other owing to the force of the torsional coil spring 85, and hence an output signal of the excessive thrust is not produced. When the tool is subjected to an excessive thrust load, the spring 75 is yielded backwardly to retreat the toolholder 6 with respect to the holder body 2. As a result, slidable engagement of the slant surface 104 with the slant surface 105 causes the displacement translation element 95 to be rotated a predetermined angle (corresponding to the clearances a) in the direction opposite to the rotational direction, with respect to the reference displacement translation element 97. This rotational movement brings about a delay by an angle (corresponding to the clearances a in the circumferential direction), which results in the difference in the number of pulses to be counted between the detection spacings 102 and 103, whereby detection signal of excessive thrust load is output.

In this toolholder device 70, the displacement detection elements 94 provided on the periphery of the toolholder device 70 are circumferentially fully separated from the associated reference detection elements 96. Therefore, these elements 94 and 97 are prevented from contacting each other, contrary to the first embodiment where one side of the displacement detection element 21 abuts against one side of the reference detecting element 24 due to the circumferential rotational movement, of the predetermined amount (clearances a), of the displacement detection element 21. For this reason, the relative circumferential movement between the detection elements 94 and 96 can be performed without suffering from the external influence by the machining liquid or dust.

A fifth embodiment of the present invention will be described with reference to FIGS. 13 to 16. A toolholder device 200 includes a holder body 2 having a grip portion 2b; a tubular portion 201 forwardly projecting from the grip portion 2b and having a support hole 202 provided in the center thereof; and a toolholder 6 having a support shaft 203 which is rotatably supported in the support hole 202 through a ball bearing 204. A pressure contact block 206 is axially movably inserted in a central hole 205 within the holder body 2 continuous to the support hole 202. Between the pressure contact block 206 and a pull stud 207 threadedly engaged with the rear end of the holder body 2 there is provided a compression spring 208 for torque transfer which forces the pressure contact block 206 to forwardly bias the support shaft 203 by way of a steel ball 209. Due to the pressing force of the steel ball 209, the rotational movement of the holder body 2 can be transmitted to the toolholder 6. The spring force of the compression spring 208 is designed to be less than the value of the small one of the maximum allowable thrust load and the maximum allowable torque so as to cope with both the thrust load and torque to be exerted on the tool.

Figure 14:
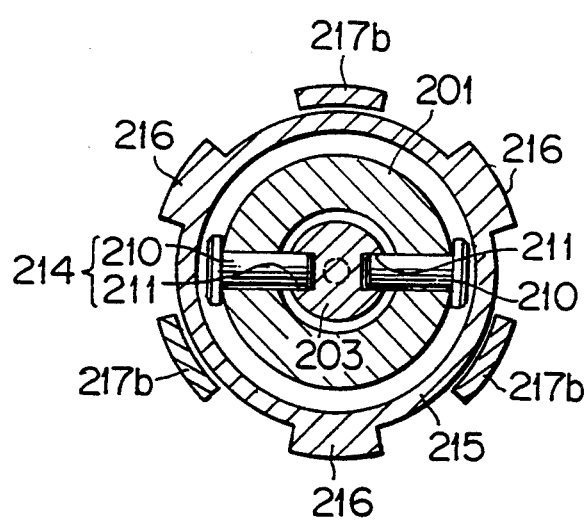
FIG. 14 is a sectional view taken along the line XIV—XIV in FIG. 13.
Figure 16:
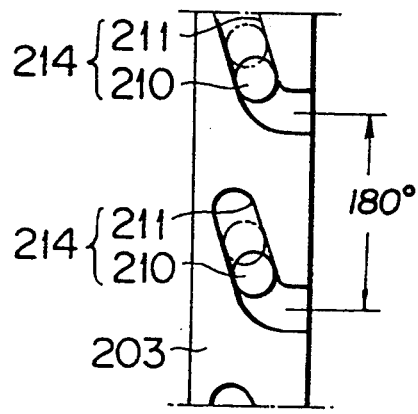
FIG. 16 is an explanatory view of the displacement translation mechanism of the fifth embodiment.

The support shaft 203 has a rear end provided with a laterally extending cam grooves 211 as shown in FIG. 14. The cam grooves 211 are shaped to slope as they extend axially backwardly, as shown in FIG. 16. The tubular portion 201 of the holder body 2 has guide pins 210 having inner ends thereof slidably inserted into the cam grooves 211. Accordingly, in conjunction with the guide pins 210 and the cam grooves 211, there can be constituted a displacement translation mechanism 214 in which axial retreating movement of the toolholder 6 causes guide pins 210 to guide the cam grooves 211 to angularly move the toolholder 6 in the circumferential direction.

On the outer periphery of the rear end of a detection tube 215 which constitute the toolholder 6 in cooperation with the support shaft 203, there are provided displacement detection elements 216 which are circumferentially angularly spaced at intervals of 120°. Reference displacement detection elements 217 are forwardly projected from the grip portion 2b of the holder body 2 circumferentially at intervals of 120° so as to confront spacings between the displacement detection elements 216. The reference detection element 217 includes a shoulder portion 217a and a protrusion 217b. The shoulder portion 217a, the protrusion 217b and the displacement detection element 216 each have a circumferential dimension of 30°. Without excessive thrust load or excessive torque, the detection tube 215 is biased in the direction Z (the same as the rotational direction) shown in FIG. 15 through the displacement translation mechanism 214 by the force of the compression spring 208, thus maintaining a state where the shoulder portion 217a is in contact with the displacement detection elements 216. At that time, the guide pins 120 are positioned with respect to the cam grooves as shown by the solid line in FIG. 16.

Figure 15:
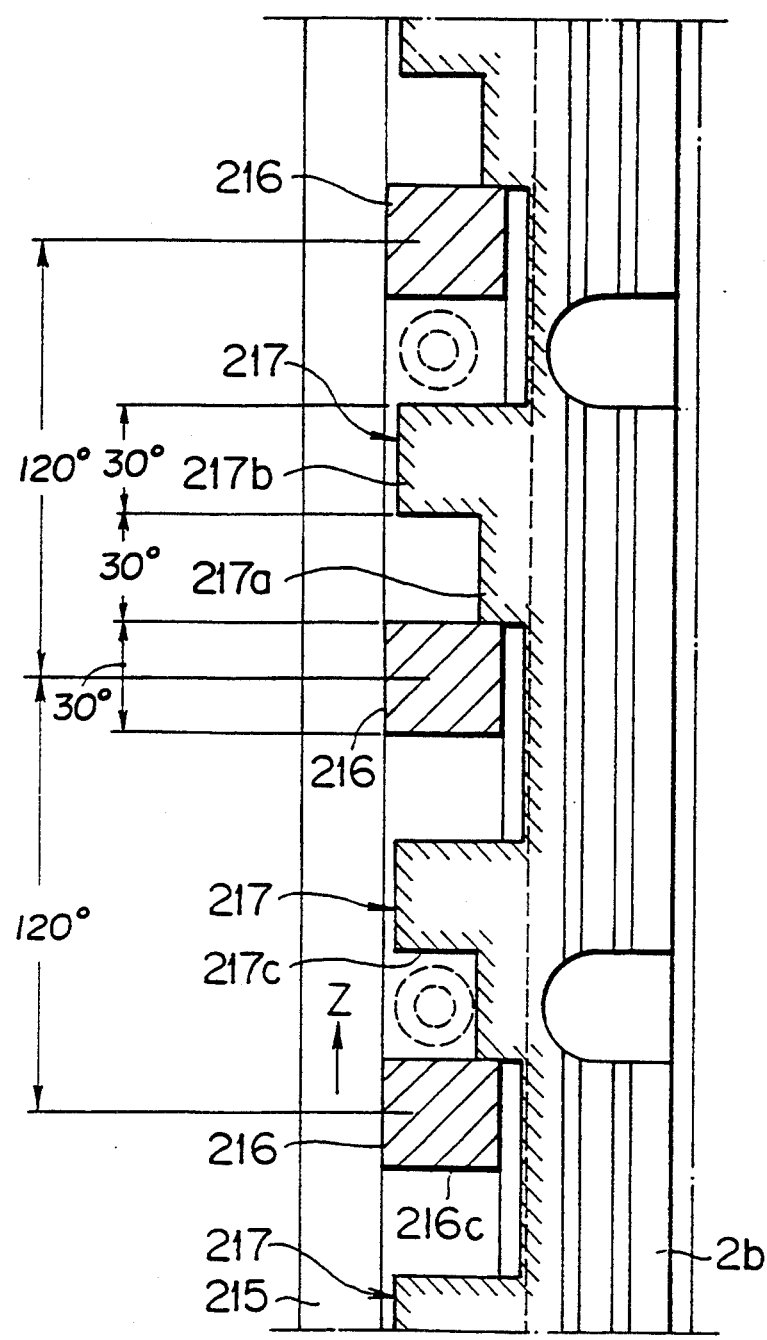
FIG. 15 is a developed diagram of the entire circumference of the displacement detection elements and the reference displacement detection element of the toolholder device of the fifth embodiment.

In this toolholder device 200, the displacement detection elements 216 and the reference detection elements 217 are rotated for machining while keeping the relationship as shown in FIG. 15, unless excessive thrust load and/or excessive torque are applied to the tool 4. In this state, the distance between the point where the proximity switch 35 is for example turned on at the detection portion 216c of the displacement detection element 216 and the point where it is again turned on at the detection portion 217c of the subsequent reference detection element 217, is unchanged and maintained at 60° and excessive load signal is not generated. When the tool is subjected to an excessive thrust load, however, the steel ball 209 compresses the compression spring 208 through the pressure contact block 206 to retreat the toolholder 6, and the guide grooves 211 are guided by the guide pins 210 with the aid of the displacement translation mechanism 214 with the result that the displacement detection element 216 are rotated in the direction opposite to the direction Z while retreating. At that time, there occurs a slippage between the ball 209 and the pressure contact block 206. In this manner, the rotation of the displacement detection elements 216 changes the intervals between the detection portion 216c and 217c, so that the changed intervals are compared with the value (60° described above) taken in the normal state. If it is outside a preset allowable value, an overload signal is generated.

Furthermore, at the time of the occurrence of the overload torque, the toolholder 6 is relatively rotated with respect to the holder body 2, and hence the displacement detection elements 216 are allowed to retreat while rotating. Incidentally, in the present embodiment, the pressure contact block 206 and steel ball 209 may be removed, and instead a torsional coil spring for torque transmission may be interposed between the rear end of the support shaft 203 and the pull stud 207.

Figure 17:
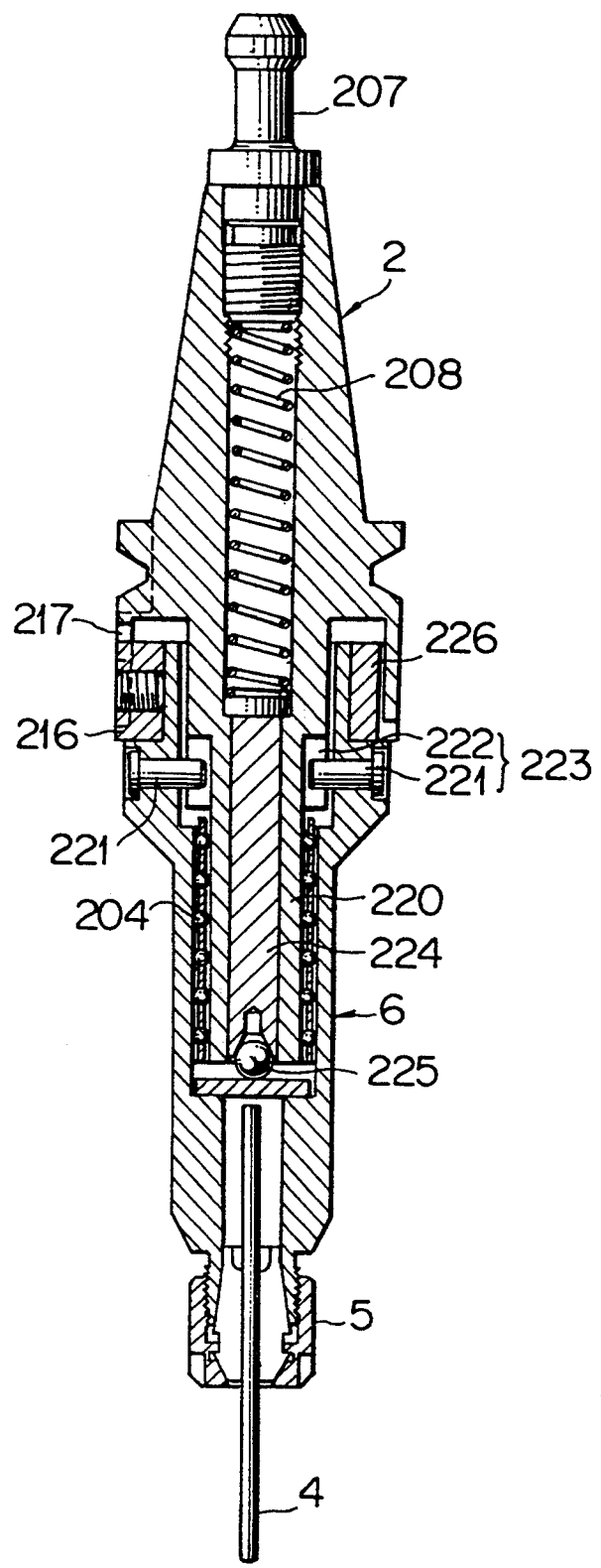
FIG. 17 shows a variation of the fifth embodiment.

A still-further embodiment of the present invention will be described below with reference to FIG. 17. In FIG. 17, guide pins 221 are provided on a toolholder 6 rotatably supported on a support shaft 220 forwardly projecting from the center of the holder body 2. Cam grooves 222 are provided on the outer periphery of the support shaft 220 so as to face the guide pins 221 to constitute a displacement translation mechanism 223. The toolholder 6 is forwardly biased by means of a compression spring 208, slidable pin 224 and steel ball 225. A detection ring 226 is integrally secured to the rear end of the toolholder 6. Displacement detection elements 216 formed on the detection ring 226 and reference detection elements 217 of the holder body 2 are the same as those in FIG. 5.

As detailed above, the toolholder device of the present invention employs a displacement translation mechanism utilizing sloping surfaces arranged within the toolholder device, to multiply an axial displacement of the toolholder into a circumferential rotational movement. Therefore, the amount of axial displacement of the toolholder required to obtain a predetermined amount of angular movement for detecting at least excessive thrust load, can be reduced. Accordingly, in a case of a toolholder device where the toolholder is axially moved for the detection of a thrust load, the influence of the axial displacement on the depth of machined hole can be diminished.

The description above has been offered for illustrative purposes only, and is not intended to limit the scope of the invention of this application which is defined in the claims below.

What is claimed is:

1. A tool holder device for a machine tool having a drive spindle for imparting rotation to a cutting tool, comprising:
   a) a holder body to be coaxially coupled to the drive spindle for joint rotation therewith;
   b) a driven toolholder coupled to the holder body for coaxial rotation with the holder body and for axial movement relative to the holder body, said tool holder including means for coaxially holding the cutting tool;
   c) spring means disposed between the holder body and the driven toolholder for yielding axially to cause the toolholder to axially displace relative to the holder body only when an axial thrust force exceeding a set value is applied to the cutting tool;
   d) a set of first displacement detecting elements on the holder body at circumferentially spaced locations about an axis of the holder body and the toolholder;
   e) a set of second displacement detecting elements on the toolholder at circumferentially spaced locations about said axis and arranged interdigitatingly with said first displacement detecting elements with clearances therebetween;
   f) displacement translation means between the holder body and the toolholder and having sloping surface means for converting an axial displacement of the toolholder due to said axial thrust force exceeding the set value into a circumferential displacement of the toolholder, said sloping surface means being disposed in a region radially inward of said first and second displacement detecting elements such that said circumferential displacement of the tool holder in the region of said sloping surface means will cause an enlarged circumferential displacement of said second displacement detecting elements of the toolholder relative to the first displacement detecting elements of the holder body; and
   g) means for sensing said enlarged circumferential displacement to detect at least said axial thrust force exceeding the set value.

2. The toolholder device according to claim 1, wherein said displacement translation means comprises first displacement translation elements fixed on the toolholder at circumferential spacings, and second displacement translation elements fixed on the holder body at circumferential spacings, said first and second displacement translation elements having first and second slant surfaces, respectively, said first slant surfaces being in face-to-face sliding engagement with said second slant surfaces whereby said first and second slant surfaces convert axial displacement of the first displacement translation elements into a circumferential displacement of the first displacement translation elements and the toolholder.

3. The toolholder device according to claim 1, wherein said displacement translation means includes a support shaft extending axially from the toolholder into the holder body, and said sloping surface means comprises sloping cam grooves formed in an outer surface of said support shaft, and guide pins projecting from the holder body and engaging the cam grooves, respectively.

4. The toolholder device according to claim 1, wherein said displacement translation means includes a support shaft extending axially from the holder body into the toolholder, and said sloping surface means comprises sloping cam grooves formed in an outer surface of said support shaft, and guide pins projecting from the toolholder and engaging the cam grooves, respectively.

5. The toolholder device according to claim 1, wherein said first and second displacement detecting elements are provided on an outer circumferential part of the holder body and on an outer circumferential part of the toolholder.

6. The toolholder device according to claim 1, further comprising a torsion spring disposed between the holder body and the toolholder for connecting the holder body and the toolholder.

7. The toolholder device according to claim 1, wherein said displacement translation means comprises a support shaft extending axially from said holder body, and a support cylinder secured in said toolholder to surround the support shaft and an inner hole in the support cylinder.

8. The toolholder device according to claim 7, wherein said sloping surface means comprises mutually engaging sloping guide means provided in opposition on the support shaft and the support cylinder.

9. The toolholder device according to claim 8, wherein said sloping guide means comprises a first helical guide groove formed in the support shaft, a corresponding second heroical guide groove formed in the inner hole of the support cylinder, and balls interposed between, and engaging with the first and second helical grooves.

10. The toolholder device according to claim 7, further comprising a ball placed on an end of said support shaft, and an axially movable block disposed between said spring means and said ball.

11. The toolholder device according to claim 1, wherein said displacement translation means comprises a support shaft extending axially from said toolholder, and a support cylinder secured in said holder body to surround the support shaft, said sloping surface means being provided between the support shaft and an inner hole in the support cylinder.

12. The toolholder device according to claim 11, wherein said sloping surface means comprises mutually engaging sloping guide means provided in opposition on the support shaft and the support cylinder.

13. The toolholder device according to claim 12, wherein said sloping guide means comprises a first helical guide groove formed in the support shaft, a corresponding second helical guide groove formed in the inner hole of the support cylinder, and balls interposed between, and engaging with the first and second helical grooves.

14. The toolholder device according to claim 11, wherein said spring means is disposed to act on a free end of the support shaft.

* * * * *